(12) United States Patent
Hacker

(10) Patent No.: US 9,884,382 B2
(45) Date of Patent: Feb. 6, 2018

(54) ROTARY TOOL FOR PRECISION MACHINING OF A DRILLED HOLE IN A WORKPIECE, AND METHOD FOR PRECISION MACHINING OF A DRILLED HOLE

(71) Applicant: Kennametal Inc., Latrobe, PA (US)

(72) Inventor: Michael Hacker, Nuremberg (DE)

(73) Assignee: KENNAMETAL INC., Latrobe, PA (US)

( * ) Notice: Subject to any disclaimer, the term of this patent is extended or adjusted under 35 U.S.C. 154(b) by 189 days.

(21) Appl. No.: 14/440,397

(22) PCT Filed: Sep. 27, 2013

(86) PCT No.: PCT/US2013/062225
§ 371 (c)(1),
(2) Date: May 4, 2015

(87) PCT Pub. No.: WO2014/197000
PCT Pub. Date: Dec. 11, 2014

(65) Prior Publication Data
US 2015/0290729 A1    Oct. 15, 2015

(30) Foreign Application Priority Data
Nov. 5, 2012   (DE) .......................... 10 2012 220 125

(51) Int. Cl.
*B23D 77/00*     (2006.01)
*B23D 77/06*     (2006.01)
*B23D 75/00*     (2006.01)

(52) U.S. Cl.
CPC ............. *B23D 77/00* (2013.01); *B23D 75/00* (2013.01); *B23D 77/003* (2013.01); *B23D 77/06* (2013.01);
(Continued)

(58) Field of Classification Search
CPC ...... B23D 77/00; B23D 77/003; B23D 77/02; B23D 77/06; B23D 2277/105
See application file for complete search history.

(56) References Cited

U.S. PATENT DOCUMENTS 1,910,940 A    5/1933  Toske
1,941,790 A *  1/1934  Davis .................. B23D 77/042
                                                   407/52
(Continued)

FOREIGN PATENT DOCUMENTS

CA    2325061 A1    5/2001
DE     542338       1/1932
(Continued)

OTHER PUBLICATIONS

Oct. 19, 2015 Office action (3 months) 1 US 2014-0169896 A1.
(Continued)

*Primary Examiner* — Ryan Rufo
(74) *Attorney, Agent, or Firm* — Ian K. Samways

(57) ABSTRACT

In order to achieve as highly accurate an alignment of the frictional tool as possible and therefore as high a drilled hole quality as possible during the precision machining of a drilled hole, the cutting edges of the frictional tool are divided into two cutting groups, the cutting edges of which are spaced apart with respect to one another in each case by an axial spacing from one another. Here, the axial spacing is selected in such a way that, at a predefined first, slower feed speed, merely the cutting edges of the first cutting edge group are in engagement with the workpiece and, at a higher, predefined second feed speed, all cutting edges are in engagement with the workpiece.

13 Claims, 3 Drawing Sheets

(52) U.S. Cl.
CPC .. *B23D 2277/105* (2013.01); *B23D 2277/205* (2013.01)

(56) References Cited

U.S. PATENT DOCUMENTS

| | | | |
|---|---|---|---|
| 2,074,424 A | | 3/1937 | Petersen |
| 2,187,221 A | | 1/1940 | Brown |
| 2,625,065 A | | 1/1953 | Trishman |
| 3,286,557 A | | 11/1966 | Rietzler |
| 3,880,545 A | | 4/1975 | Kress |
| 4,129,400 A | * | 12/1978 | Wozar ................ B23B 51/0426 408/206 |
| 4,293,252 A | | 10/1981 | Kress |
| 4,294,319 A | | 10/1981 | Guergen |
| 4,425,063 A | | 1/1984 | Striegl |
| 4,596,498 A | | 6/1986 | Kress |
| 4,850,757 A | | 7/1989 | Stashko |
| 5,149,233 A | | 9/1992 | Kress |
| 5,486,075 A | * | 1/1996 | Nakamura ............. B23B 51/02 408/224 |
| 5,865,573 A | | 2/1999 | Kress |
| 5,906,458 A | | 5/1999 | Planche |
| 5,957,633 A | | 9/1999 | Hall |
| 6,033,159 A | | 3/2000 | Kress |
| 6,254,319 B1 | | 7/2001 | Maier |
| 6,287,057 B1 | | 9/2001 | Kurz |
| 6,379,090 B1 | * | 4/2002 | Halley ................ B23D 77/003 408/227 |
| 6,536,997 B1 | | 3/2003 | Kress |
| 6,554,549 B1 | | 4/2003 | Kurz |
| 6,676,338 B2 | * | 1/2004 | Kress ................ B23D 77/003 407/35 |
| 7,089,837 B2 | | 8/2006 | Feil |
| 7,114,893 B2 | | 10/2006 | Mast et al. |
| 7,363,692 B2 | | 4/2008 | Kress et al. |
| 7,632,050 B2 | | 12/2009 | Nuzzi et al. |
| 2003/0077135 A1 | | 4/2003 | Agarico |
| 2003/0175085 A1 | | 9/2003 | Prokop |
| 2005/0169721 A1 | | 8/2005 | Schulte |
| 2011/0176878 A1 | | 7/2011 | Nomura |
| 2012/0020750 A1 | * | 1/2012 | Bitzer .................. B23 77/02 408/56 |
| 2013/0004253 A1 | * | 1/2013 | Kauper ............... B23B 51/08 408/59 |
| 2013/0078045 A1 | | 3/2013 | Randecker |
| 2014/0169896 A1 | | 6/2014 | Kunschir |

FOREIGN PATENT DOCUMENTS

| | | |
|---|---|---|
| DE | 1627222 U | 8/1951 |
| DE | 1922131 U | 8/1965 |
| DE | 1239911 B | 5/1967 |
| DE | 2237743 A1 | 2/1974 |
| DE | 3402551 A1 | 8/1985 |
| DE | 3419350 A1 | 11/1985 |
| DE | 3022984 C2 | 5/1986 |
| DE | 3820485 C1 | 8/1989 |
| DE | 3316053 C2 | 6/1992 |
| DE | 3842437 C2 | 8/1992 |
| DE | 102006024569 A1 | 12/2007 |
| EP | 2745967 A1 | 6/2014 |
| GB | 2075383 A | 11/1981 |
| JP | 01-306122 A * 12/1989 ............ B23D 77/00 |
| WO | WO2011142370 A1 | 11/2011 |

OTHER PUBLICATIONS

Jun. 18, 2014—Search_Report_and_Written_Opinion Jun. 18, 2014—Search_Report_and_Written_Opinion.
IL 229547, Oct. 12, 2015 First office action IL 229547.
Nov. 28, 2016 First office action.
Feb. 16, 2017 Second Office Action.

* cited by examiner

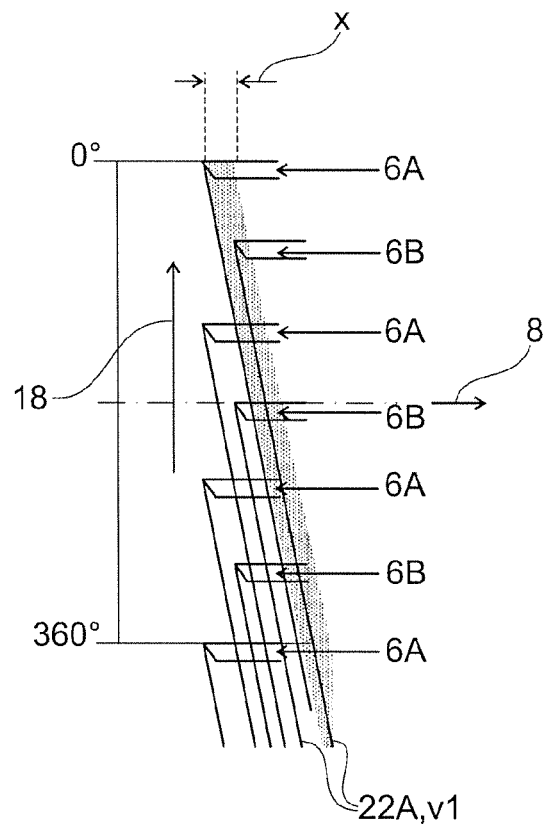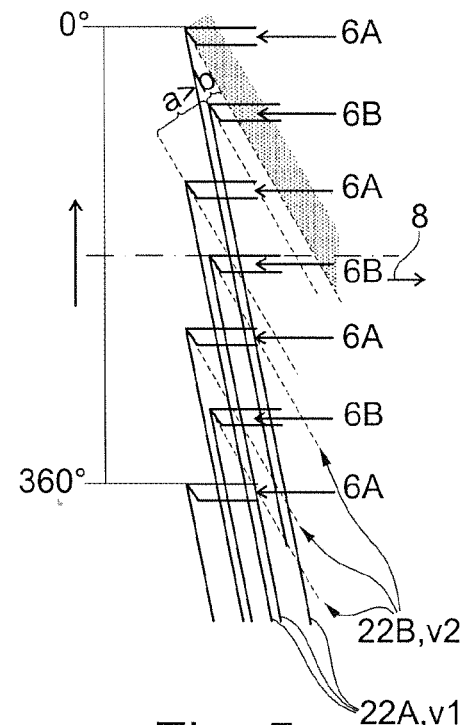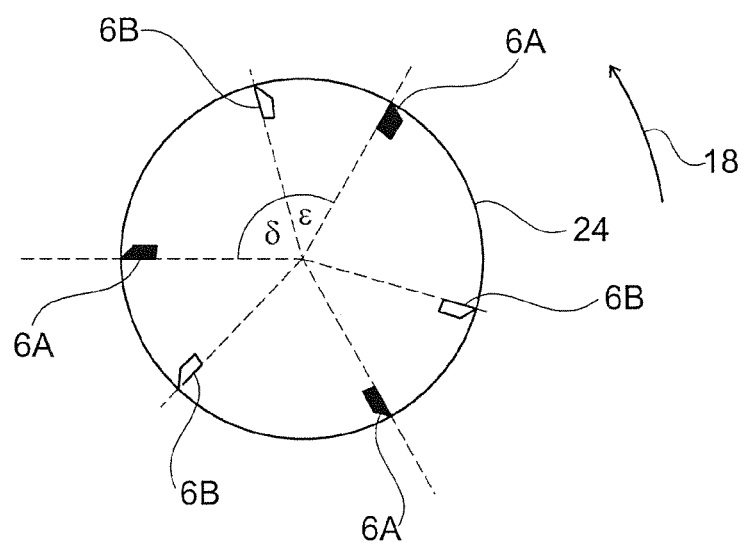

ROTARY TOOL FOR PRECISION MACHINING OF A DRILLED HOLE IN A WORKPIECE, AND METHOD FOR PRECISION MACHINING OF A DRILLED HOLE

CLAIM TO PRIORITY

This application is the National Stage of International Application No. PCT/US2013/062225, filed on Sep. 27, 2013, the entire contents of which is incorporated herein by reference.

FIELD OF THE INVENTION

The invention relates to a rotary tool for precision machining of a drilled hole in a workpiece, in particular a frictional tool, having a tool head which extends in the axial direction and has a plurality of cutting edges on its circumference, which cutting edges are arranged on an identical cutting circle. Furthermore, the invention relates to a method for precision machining of a drilled hole with the aid of a rotary tool of this type.

BACKGROUND OF THE INVENTION

For highly precise production or precision machining of drilled holes, frictional tools are usually used as precision machining tools or what are known as finishing tools. A frictional tool of this type can be gathered, for example, from US 2003/0156912 A1. Frictional tools of this type usually have a plurality of (reaming) cutting edges which are arranged in each case on a common cutting circle, that is to say are at the same radial spacing from a tool center axis. For precision machining of a drilled hole, the frictional tool is guided up to said drilled hole. Firstly the exact roundness of the drilled hole but also the exact orientation along a desired drilled hole longitudinal axis are decisive for highly precise drilled-hole machining. In order to ensure this, the center or rotational axis of the frictional tool has to coincide with the desired setpoint longitudinal axis of the drilled hole and also has to be oriented exactly with respect to said longitudinal axis. In the real world application situation, however, there is the problem that these two preconditions are not always met in a satisfactory manner.

SUMMARY OF THE INVENTION

Proceeding herefrom, the invention is based on the object of specifying a rotary tool and a method for precision machining of a drilled hole, which ensure high quality precision machining.

According to the invention, the object is achieved by a rotary tool having the feature of claim 1 and by a method having the features of claim 11.

The rotary tool has a tool head which extends in the axial direction and has a plurality of cutting edges on its circumference. Said cutting edges are arranged on an identical cutting circle. Here, the cutting edges are divided into a first cutting edge group and a second cutting edge group, the two cutting edge groups being spaced apart from one another in the axial direction by an axial spacing. Said axial spacing is selected in such a way that, at a predefined first feed speed, only the cutting edges of the first cutting edge group are in engagement with the workpiece, and that, at a predefined second feed speed which is faster than the first feed speed, the cutting edges of both the first and the second cutting edge group are in engagement with the workpiece. Here, the cutting edges of the respective cutting edge group are usually arranged at the same axial height and each individual cutting edge is usually also allocated a dedicated flute for transporting away the drilling chips here.

In the method according to the invention, first of all the slower feed speed is set at the beginning of the precision machining with a rotary tool of this type, with the result that merely the first cutting edge group is in engagement with the workpiece. After a predefined axial feed has been reached, the feed speed is then increased, in particular to the second feed speed, with the result that it is ensured that all cutting edges come into engagement with the workpiece.

Rotary tool is generally understood to mean a tool which rotates about a rotational axis during machining. In particular, it is a frictional tool. In addition, the concept which is described here is preferably also used in spindle tools and counterboring tools.

This embodiment is based on the finding that the quality of the hole machining is influenced decisively at the beginning of the precision machining operation, since an alignment of the precision machining tool relative to the drilled hole takes place at the beginning of the precision machining operation. Even in the case of highly accurate machine tools, in which the precision machining tool is clamped, a certain offset and/or a certain oblique positioning, for example, as a result of elastic yielding cannot be avoided completely, for example.

Tests have now shown that the alignment at the beginning of the precision machining operation is influenced decisively by the number of cutting edges which come into engagement with the workpiece. It has been determined here that a lower number of cutting edges or even only one cutting edge is advantageous, since very satisfactory true running coaxially with respect to the desired drilled hole longitudinal axis is produced as a result and the rotary tool does not follow a pilot hole (drilled hole) which is already present and is possibly not very positionally accurate.

However, a low number of cutting edges leads to only a low process speed, since the cutting capacity per cutting edge and therefore the feed per cutting edge and revolution are restricted.

Highly accurate precision machining with simultaneous retention of a very high process speed is then achieved by way of the rotary tool according to the invention and by way of the method according to the invention. The specially configured rotary tool namely makes it possible to begin the precision machining operation first of all with an only small number of cutting edges and therefore to achieve high accuracy and alignment of the precision machining tool. At the same time, the tool permits a high process speed to be set by switching over to the second feed speed, since the cutting capacity is then distributed to a greater number of cutting edges.

Furthermore, for the same purpose, the number of cutting edges in both cutting edge groups is selected to be equally large in one preferred embodiment. Here, the overall number of cutting edges also depends, in particular, on the selected nominal diameter of the tool. In the case of a rotary tool having a diameter of up to 8 mm, four cutting edges are typically used, in the case of a rotary tool having a diameter of between 8 and 25 mm, six cutting edges are typically used and, in the case of a rotary tool having a nominal diameter of greater than 25 mm, eight cutting edges are typically used. As an alternative to the symmetrical division of the number of cutting edges to the first and second cutting edge group, there is also the possibility of an asymmetrical division, for example 1/2, 1/3, 2/4, 2/6, 3/5, etc. the first number in each case specifying the number of cutting edges of the first cutting edge group and the second number specifying the number of cutting edges of the second cutting edge group.

It is provided in one expedient development, furthermore, that the cutting edges of a respective cutting edge group are arranged substantially identically distributed around the circumference. Here, substantially identically distributed is understood to mean that a deviation from the accurate identical distribution by a few percent, for example by ±5%, is also included. This leads to a slight unequal distribution which is often desired and is explicitly also set, in order to counteract an inclination to rattle, that is to say periodic resonance.

Overall, in the case of the rotary tool with six cutting edges, three cutting edges are therefore assigned to the first cutting edge group, which cutting edges are arranged in each case offset rotationally with respect to one another by approximately 1200. At the same time, three cutting edges are likewise assigned to the second cutting edge group, which cutting edges are likewise arranged offset rotationally with respect to one another approximately by 1200, the cutting edges of the second cutting edge group being spaced apart in each case by the same identical axial spacing from the cutting edges of the first cutting edge group. Said cutting edges all lie at an identical axial height. The second cutting edges are arranged in each case between a leading and a trailing cutting edge of the first cutting edge group.

With regard to machining which is as homogeneous as possible, the cutting edges of the first and the second cutting edge group are therefore arranged alternately with respect to one another in the circumferential direction, and a cutting edge of the second cutting edge group therefore in each case follows a cutting edge of the first cutting edge group.

The first feed speed is preferably selected to be in the range between 0.01 and 0.05 mm axial feed per cutting edge. At the same time, the second feed speed is selected to be between approximately 5 times and 10 times the first feed speed. It usually lies in the range between 0.1 and 0.5 mm per cutting edge.

The first, slow feed speed automatically results in an axial minimum spacing in the case of a predefined distribution of the cutting edges around the circumference and also in the case of a predefined cutting edge distribution around the circumference. Here, said axial minimum spacing has to be selected to be sufficient, in order to ensure that the second cutting edge group does not come into engagement with the workpiece. The axial spacing is preferably selected to be approximately from two times to three times as great as said minimum axial spacing and is preferably set between 0.03 mm and 0.05 mm and at most preferably to 0.1 mm.

Very satisfactory results and highly accurate drilled holes can be formed with simultaneously high process speeds by way of said selected first and second feed speeds and the selected axial spacing.

In one expedient development, the cutting edges of the second cutting edge group are not arranged identically distributed between a leading and a trailing cutting edge of the first cutting edge group, but rather have different angular spacings from the leading and trailing associated cutting edge of the first cutting edge group. By way of this preferred embodiment, as uniform a distribution as possible of the cutting capacity to all teeth is achieved generally in an expedient embodiment. The cutting capacity is namely not distributed homogeneously to the cutting edges of the first and the second cutting group depending on the selected second feed speed and the axial spacing. Here, cutting capacity is understood to mean in each case the axial penetration depth of a respective cutting edge into the workpiece at the selected feed speed.

Here, the angular spacing from the leading cutting edge is expediently greater than from the trailing cutting edge of the first cutting edge group. Here, the angular spacings are approximately in the ratio of 60 to 40.

BRIEF DESCRIPTION OF THE DRAWINGS

In the following text, an exemplary embodiment of the invention will be explained in greater detail using the figures, in which, in each case in diagrammatic illustrations:

FIG. 4 shows a flattened illustration, similar to FIG. 2, of a frictional tool according to the invention with two cutting edge groups which are spaced apart from another by an axial spacing at a predefined slow feed speed, FIG. 5 shows an illustration according to FIG. 4, the trajectories of the cutting edges at a second, higher feed speed additionally being shown, FIG. 6 shows a diagrammatic illustration of the angular distribution of the cutting edges of the first and the second cutting edge group.

DETAILED DESCRIPTION OF THE INVENTION

Figure 1:
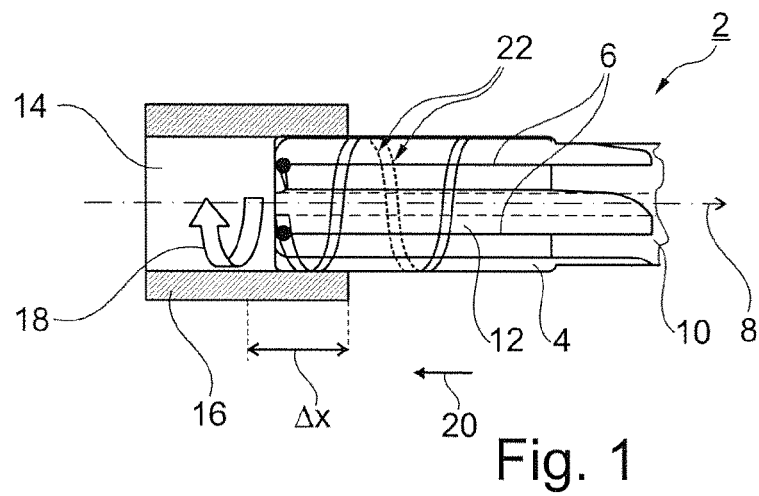
FIG. 1 shows a simplified illustration from the side of a frictional tool, shown in details, in engagement with a pilot-drilled workpiece, shown in section, in accordance with the prior art.

In the figures, identically acting parts are provided with the same designations.

The rotary tool which is configured as a frictional tool 2 has a tool head 4 with a plurality of cutting edges 6 which are arranged distributed around the circumference and are configured as cutting bars. The frictional tool 2 extends along a rotational axis which at the same time forms a center axis in the axial direction 8 from the tool head 4 to a rear shank 10 (shown only in details here) which is adjoined at the rear end by a clamping shank, by way of which the frictional tool 2 is clamped into a machine tool. In the exemplary embodiment, the cutting edges 6 extend parallel to the axial direction 8, beginning on the end side. As an alternative, they can also be of helical configuration. No further cutting edges are arranged in addition to the (reaming) cutting edges 6. Each cutting edge 6 is assigned a respective flute 12. During the precision machining of a drilled hole 14 of a workpiece 16, the frictional tool 2 rotates about the rotational axis in the rotational direction 18. Here, the frictional tool 2 is advanced in the feed direction 20 counter to the axial direction 8 which is shown. As a result of the superimposed movement directions, the individual cutting edges 6, more precisely the frontmost cutting edges, run along spiral trajectories 22 in relation to the workpiece 6.

Figure 2:
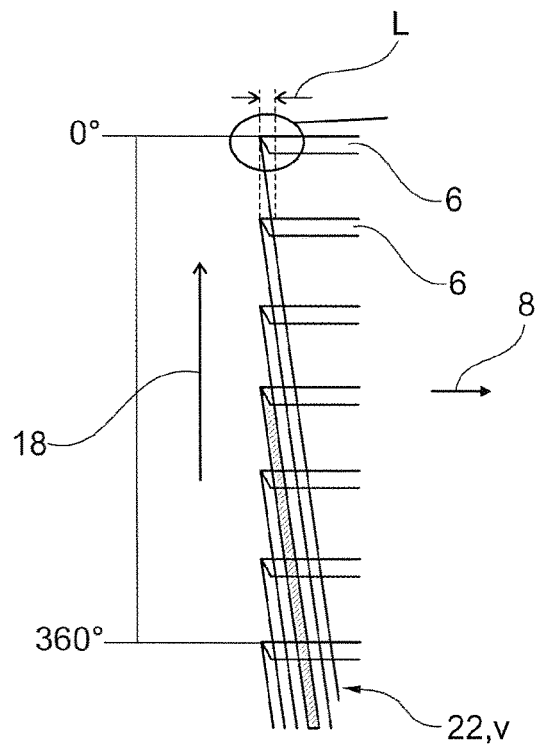
FIG. 2 shows a flattened illustration of the cutting edges of the frictional tool according to FIG. 1 with the trajectories of the cutting corners at a predefined feed speed.

FIG. 2 shows the situation from FIG. 1 in a linearly flattened state. Here, the trajectories 22 are shown by obliquely running lines. Here, the inclination of the trajectories 22 is defined by the feed speed which is set. At a defined feed speed v, the cutting capacity of a respective cutting edge 6 is defined by the engagement length, l, of a respective cutting edge 6 in the axial direction 8, which engagement length, l, is defined at the same time by the spacing between two trajectories 22.

Here, the region which is shown using dashed lines in FIG. 2 specifies the material-removing volume and therefore the material-removing capacity of the fourth cutting edge 6.

Figure 3:
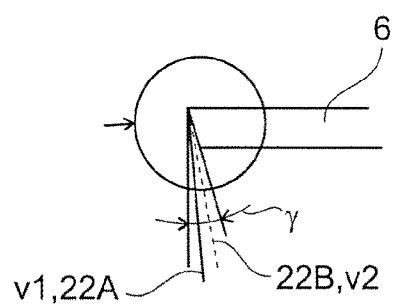
FIG. 3 shows an enlarged illustration of a cutting edge of that region of FIG. 2 which is identified by a circle, with supplementary explanations.

The situation at the cutting corner at different feed speeds v1, v2 is shown using the enlarged illustration according to FIG. 3.

The cutting edge 6 first of all has a clearance angle y. At a low feed speed v1, the corresponding trajectory 22A has merely a small angle and, at a faster feed speed, the corresponding trajectory 22B (shown using a dashed line) has a greater angle of inclination. Here, the clearance angle y in each case has to be greater than the angle of inclination which is defined by the feed speed v.

Embodiments according to the invention of the frictional tool 2 will now be explained in greater detail using FIGS. 4 to 8. In the case of said frictional tool 2, the cutting edges 6 are divided into two cutting groups A, B, the cutting edges of cutting group A being provided with the designation 6A and those of the cutting group B being provided with the designation 6B. It is then of essential significance that the cutting edges 6A, 6B of the two cutting groups A, B are spaced apart from one another by an axial spacing x, that is to say the cutting edges 6B are arranged set back in the axial direction 8 by the axial spacing x. Here, the cutting edges 6A, 6B of a respective cutting group A, B are arranged in each case at the same axial height. As is also apparent, in particular, from FIG. 6, the cutting corners of all cutting edges 6A, 6B are arranged on a common cutting circle 24.

FIG. 4 shows the machining situation at a low first feed speed v1. As can be seen using the trajectories 22A, the cutting edges 6B lie in each case in the "shadow" of the respectively leading cutting edge 6A on account of the set-back arrangement. The cutting edges 6B are therefore not in engagement with the workpiece 16 at the selected low feed speed v1. As a result, only a few cutting edges 6A are in engagement at the beginning of the machining operation, that is to say when the frictional tool 2 is moved up to the drilled hole 14 and is introduced into the latter. Highly accurate alignment of the frictional tool 2, in particular of its center axis with respect to the drilled-hole axis, is achieved as a result. In the ideal case, said two axes should be oriented in an axially parallel manner and should coincide.

The illustration according to FIG. 5 then shows a situation when the frictional tool is advanced at a higher, second feed speed v2. Correspondingly, the associated trajectories 22B are also inclined at a greater angle, with the result that the cutting edges 6B of the second cutting edge group B then also come into engagement and contribute to the removal of material. The material-removing capacity is therefore then distributed to all six cutting edges 6A, 6B at the second feed speed v2.

As can be gathered from FIG. 5, however, the cutting capacity is distributed differently to the cutting edges 6A and 6B. The cutting edges 6A of the first cutting group A contribute a greater proportion of the material-removing capacity, which leads to premature wear.

Figure 7:
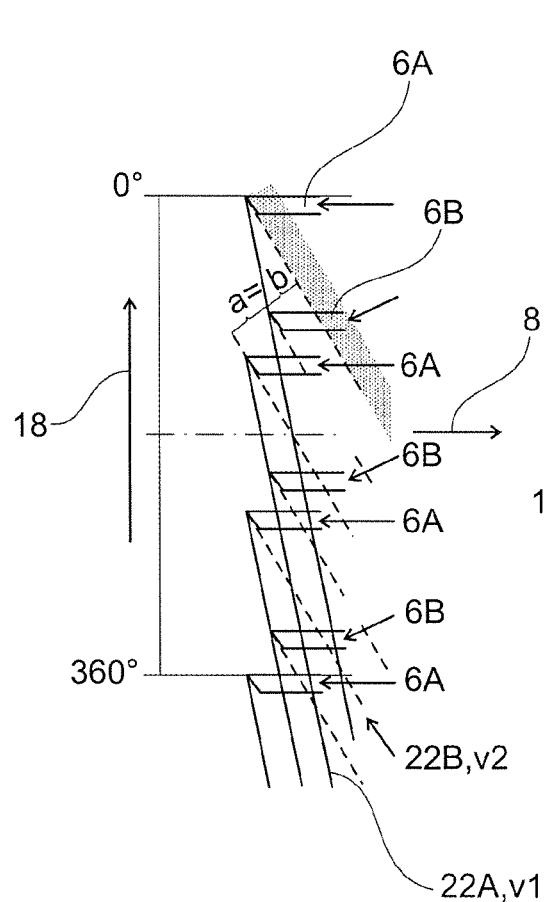
FIG. 7 shows the flattened illustration according to FIGS. 4 and 5 with the angular distribution of the cutting edges according to FIG. 6.

In order to avoid this, an angular distribution of the cutting edges 6A, 6B is then performed, as can be gathered from FIGS. 6 and 7. In general, depending on the selected second, higher feed speed v2, the angular spacing of a respective cutting edge 6B of the second cutting edge group B from the leading and trailing cutting edge 6A of the first cutting edge group is selected differently, with the result that the cutting edge 6B is arranged asymmetrically with regard to said two cutting edges 6A. As can be gathered, in particular, from FIG. 6, the angular spacing 0 from the leading cutting edge is greater than the angular spacing δ from the trailing cutting edge 6A. Here, the angular spacing δ, ε is selected in such a way that the cutting capacity is distributed homogeneously to the cutting edges 6A, 6B, as is shown in FIG. 7. Here, the cutting capacity of the individual cutting edge groups A, B is shown in each case in the illustrations of FIGS. 5 and 7 by the lower case letters a, b. As can be seen in FIG. 7, the cutting capacities a, b are identical.

In the exemplary embodiment, six cutting edges are provided for the frictional tool 2. Here, the cutting edges of the respective cutting edge group A, B are arranged in each case distributed at least substantially identically, that is to say in each case have an angular spacing of 120° from one another. Slight deviations from said angular spacing are partially desired, in order to counteract an inclination to rattle.

In addition, fewer or more cutting edges 6 can also be provided. Typical parameter values for the different relevant variables result from the following table, in particular also depending on the diameter of the frictional tool.

| Diameter, tool [mm] | ≤8 | | 8-25 | | ≥25 | | |
|---|---|---|---|---|---|---|---|
| Number of cutting edges | 4 | | 5 | | 8 | | |
| Number of cutting edges, group A | 2 | | 3 | | 4 | | |
| Number of cutting edges, group B | 2 | | 3 | | 4 | | |
| v1 feed speed [mm/cutting edge] | 0.02 | 0.04 | 0.02 | 0.04 | 0.02 | 0.04 | 0.00 |
| Limiting feed [mm/cutting edge] | 0.048 | 0.052 | 0.048 | 0.052 | 0.048 | 0.052 | 0.15 |
| v2 feed speed [mm/cutting edge] | 0.12 | 0.2 | 0.12 | 0.2 | 0.12 | 0.2 | 0.3 |
| Limiting axial spacing [mm] | 0.01 | 0.02 | 0.01 | 0.02 | 0.01 | 0.02 | 0.03 |
| x. axial spacing [mm] | 0.03 | | 0.03 | | 0.03 | 0.03 | 0.1 |
| δ. angular spacing from the leading cutting edge | 112.5 | 103.5 | 75 | 60 | 56.25 | 51.75 | 68 |

-continued

| | | | | | | | |
|---|---|---|---|---|---|---|---|
| 6A | | | | | | | |
| ε. angular spacing from the trailing cutting edge 6A | 87.5 | 76.5 | 45 | 61 | 33.75 | 38.25 | 39 |

As can be gathered from this, the values for the first, slow feed speed typically lie in the range from 0.01 to 0.08 and, in particular, at 0.02 mm per cutting edge. The limiting feed specified in the table in millimeters per cutting edge and revolution results from the selected total number of cutting edges in the case of an assumed homogeneous distribution of the cutting edges in two cutting edge groups. Here, the limiting feed defines the minimum feed speed of the second higher feed speed, from which the cutting edges 6B of the second cutting edge group B also pass into engagement.

Furthermore, it can be gathered from the table that the second, higher feed speed typically lies in the range between 0.1 and approximately 0.8, preferably in the region of 0.2.

Taking the number of cutting edges into consideration (in the case of a uniform distribution to the two groups), the first feed speed v1 then results in a limiting axial spacing which has to at least be maintained, in order to ensure that merely the cutting edges 6A of the first cutting edge group are in engagement. In order to set a sufficient tolerance spacing here, the axial spacing x is preferably selected to be in the range from approximately 0.03 to 0.08 mm.

Finally, the last two lines of the table indicate typical values for the angular spacing δ from the leading and ε from the trailing cutting edge. Here, the angular spacing from the leading cutting edge δ is defined by the angular spacing between two first cutting edges 6A plus the quotient from the axial spacing in millimeters divided by the second, higher feed speed in millimeters per degree.

In the case of a total of four cutting edges, the angular spacing δ therefore lies approximately in the range between 100 and 115°, depending on the selected axial spacing and the second feed speed. In the case of six cutting edges, the angular spacing 5 lies in the range from approximately 65 to 80° and, in the case of eight cutting edges, it lies in the range from approximately 50 to 65° (in each case in the case of an at least approximately identical distribution of the first cutting edges 6A).

Figure 8:
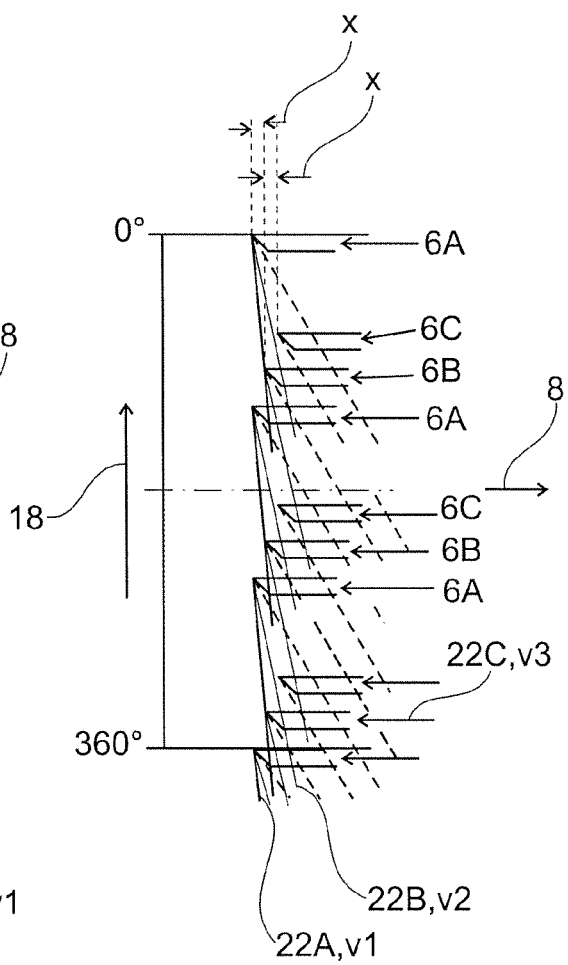
FIG. 8 shows a flattened illustration of the trajectories of a rotary tool with three cutting groups with cutting edge groups which are offset in each case with respect to one another by an axial spacing.

Finally, FIG. 8 shows a situation with a third cutting edge group C with third cutting edges 6C. In this exemplary embodiment, the frictional tool 2 then has a total of nine cutting edges, that is to say three cutting edges 6A, 6B, 6C for each group. A switch over to a third feed speed v3 which is defined by a third trajectory 22C is additionally also provided.

The consideration as described in conjunction with FIGS. 4 to 7 with regard to the selection of the angular spacing between the individual cutting edges 6A, 6B, 6C can also be transferred to this variant in a corresponding manner.

In the machining method with a frictional tool 2 of this type, the procedure is then such that the frictional tool 2 is first of all advanced at the low feed speed v1 at the beginning of the machining operation and is switched over to the higher feed speed v2 after reaching a predefined axial position within the workpiece 16. As a result, first of all only the cutting edges of the first cutting group A are in engagement at the beginning of the machining method, and subsequently all cutting edges are in engagement with the same material-removing capacity. Here, the switch over takes place after an axial feed Δx in the range from 0.2 mm to 0.5 mm (cf. FIG. 1 with respect to the axial feed Δx).

For the angular distribution of the individual cutting edges 6A, 6B, the additional cutting capacity at the machining start of the cutting edges 6A can also be taken into consideration in addition, with the result that this is also compensated for by corresponding angular positioning of the cutting edges 6A, 6B for a respective application.

What is claimed is:

1. A rotary tool for precision machining of a drilled hole in a workpiece, the rotary tool comprising:
   a tool head which extends in an axial direction,
   the tool head having a plurality of cutting edges on its circumference, wherein the cutting edges are arranged on an identical cutting circle,
   the cutting edges being divided into more than two cutting edge groups,
   wherein the cutting edges of each cutting edge group are spaced apart axially from the cutting edges of the other cutting edge groups,
   the cutting edge groups comprising a first cutting edge group and a second cutting edge group,
   wherein the first and second cutting edge groups are spaced apart from one another in the axial direction by an axial spacing which is selected such that:
      at a predefined first feed speed, only the cutting edges of the first cutting edge group are in engagement with the workpiece, and
      at a predefined second feed speed which is faster than the first feed speed, the cutting edges of both the first and the second cutting edge group are in engagement with the workpiece.

2. The rotary tool as claimed in claim 1, wherein the cutting edges of the first and the second cutting edge group are arranged alternately with respect to one another.

3. The rotary tool as claimed in claim 1, wherein the two cutting edge groups have the same number of cutting edges.

4. The rotary tool as claimed in claim 1, wherein the cutting edges of a respective cutting edge group are arranged to be substantially identically distributed around the circumference.

5. The rotary tool as claimed in claim 1, wherein the first feed speed lies at from 0.01 to 0.05 mm axial feed per cutting edge and the second feed speed lies between 5 times and 10 times the first feed speed.

6. The rotary tool as claimed in claim 1, wherein the axial spacing lies between 0.03 mm and 0.1 mm.

7. The rotary tool as claimed in claim 1, wherein a respective cutting edge of the second cutting edge group is arranged asymmetrically at different angular spacing with respect to a leading and a trailing cutting edge of the first cutting edge group.

8. The rotary tool as claimed in claim 7, wherein the angular spacing from the leading cutting edge of the first cutting edge group is selected in such a way that, at a predefined second feed speed, the cutting capacity of the cutting edges of the first and the second cutting edge groups are identical.

9. The rotary tool as claimed in claim 7, wherein the angular spacing from the leading cutting edge is greater than from the trailing cutting edge of the first cutting edge group.

10. The rotary tool as claimed in claim 1, wherein the rotary tool comprises a frictional tool.

11. A method for precision machining of a workpiece with the aid of a rotary tool as claimed in claim 1, in which method, at the beginning of the machining, a first slower feed speed is set, and the feed speed is increased after a predefined axial feed.

12. The method as claimed in claim 11, wherein a switchover is made to a second, higher feed speed.

13. The method as claimed in claim 11, wherein a switch over is made to the higher feed speed at an axial feed between 0.2 mm and 0.5 mm.

* * * * *